US008436487B2

(12) United States Patent
Zender

(10) Patent No.: US 8,436,487 B2
(45) Date of Patent: May 7, 2013

(54) METHOD AND SYSTEM FOR CONTROL AND POWER SUPPLY OF AT LEAST ELECTRICAL CONSUMER

(76) Inventor: Arnold Zender, Mühltal (DE)

( * ) Notice: Subject to any disclaimer, the term of this patent is extended or adjusted under 35 U.S.C. 154(b) by 225 days.

(21) Appl. No.: 12/676,452

(22) PCT Filed: Sep. 5, 2008

(86) PCT No.: PCT/EP2008/007275
§ 371 (c)(1),
(2), (4) Date: Jun. 7, 2010

(87) PCT Pub. No.: WO2009/033610
PCT Pub. Date: Mar. 19, 2009

(65) Prior Publication Data

US 2011/0175459 A1 Jul. 21, 2011

(30) Foreign Application Priority Data

Sep. 7, 2007 (DE) ......................... 10 2007 042 508

(51) Int. Cl.
*H02J 3/02* (2006.01)

(52) U.S. Cl.
USPC ........................................................ 307/3

(58) Field of Classification Search ........................ 307/3
See application file for complete search history.

(56) References Cited

U.S. PATENT DOCUMENTS

| | | | | |
|---|---|---|---|---|
| 5,471,119 | A | 11/1995 | Ranganath | |
| 6,005,475 | A * | 12/1999 | Takasan et al. | 375/258 |
| 2005/0017848 | A1* | 1/2005 | Flen et al. | 340/310.01 |
| 2006/0071552 | A1* | 4/2006 | Lamon et al. | 307/3 |

FOREIGN PATENT DOCUMENTS

| | | | |
|---|---|---|---|
| DE | 9116534 | U1 | 4/1993 |
| DE | 10162941 | C1 | 8/2003 |
| WO | 03065201 | A | 8/2003 |

OTHER PUBLICATIONS

International Search Report from corresponding International Application PCT/EP2008/007275.

* cited by examiner

*Primary Examiner* — Daniel Cavallari
(74) *Attorney, Agent, or Firm* — WRB-IP LLP

(57) ABSTRACT

A method for controlling and supplying power to at least one electrical consumer that is connectable in a wired, electrically conductive fashion to an energy source is provided. In the method, electrical energy is transferred by an alternating voltage and control information for activating the at least one electrical consumer is transmitted to the electrical consumer by an angle modulation of the alternating voltage used for the power supply. The control information is transmitted in binary form by a frequency modulation, wherein individual binary values are depicted and transmitted by an associated predetermined frequency of the alternating voltage used for the power supply. Each binary value is transmitted by a plurality of oscillations of the alternating voltage. A system for controlling and supplying power to at least one electrical consumer that is connectable in a wired, electrically conductive fashion to an energy source by a cable includes a device for generating an alternating voltage that is disposed between the energy source and the at least one electrical consumer and a device for the angle modulation of the alternating voltage, the electrical consumer comprising a decoder.

12 Claims, 3 Drawing Sheets

METHOD AND SYSTEM FOR CONTROL AND POWER SUPPLY OF AT LEAST ELECTRICAL CONSUMER

The invention relates to a method for controlling and supplying power to at least one electrical consumer that is connectable in a wired, electrically conductive fashion to an energy source.

An increasing number of electrical consumers are being used in modern homes, work environments, and leisure facilities to offer users a large number of possibilities and amenities. At the same time the activation and in particular the operation of individual electrical consumers needs to be improved.

An example of the increasing requirements on the control and power supply of electrical consumers is lighting technology. Users desire multi-color, controllable lighting systems that can be activated selectively. At the same time, such lighting systems are to be as efficient or energy-saving as possible and allow for an inexpensive implementation and simple installation. Other very similar examples relate to different areas of building services such as the control of heating, air conditioning, and comfort and wellness equipment. However, industrial applications, such as use on ships, yachts or in airplanes, are possible as well.

Lighting systems from practical applications are known that use separate lines or even separate cables for the control and power supply. DE 10 2007 010 998 A1 describes a method and a device in which a consumer, in this case an electric drive, is supplied with power as well as control signals by means of three separate lines with the power being transmitted by means of two lines and the control signals being transmitted by means of a third, separate line in the form of a commercially available three-phase cable. In other known systems it is additionally necessary for the control device to be supplied with power separately, i.e., to have a power supply that is separate from the electrical consumers.

Lighting systems are known from practical applications that have a wired power supply and a wireless control, for example, by using radio transmission, infrared or ultrasound transmission.

The known methods for controlling and supplying power to electrical consumers have an elaborate design and often are susceptible to interference. It costs relatively more to install and activate electrical consumers due to the separate control of the electrical consumers.

It is desirable to provide a method for the control and power supply of a least one electrical consumer so that the control of the electrical consumer is as inexpensive and interference resistant as possible. Installation as well as activation and control of individual electrical consumers are to be as simple as possible.

In accordance with an aspect of the present invention, electrical energy is transmitted by means of an alternating voltage, and control information for activating the at least one electrical consumer is transmitted to the electrical consumer by means of an angle modulation of the alternating voltage used for the power supply. One substantial advantage of the transmission of control information by way of angle modulation of the alternating voltage used for the power supply is the fact that the same lines can be used to supply the electrical consumer with power as well as with control information. Separate control lines or elaborate bus systems are not necessary.

In a particularly advantageous manner the electrical energy and the control information are transmitted on the same lines. In a simple case only a two-core, non-polarized connecting line is required. The installation of multiple interconnected electrical consumers is very simple since a separate supply of power and control information is not required, nor must special polarization or connection technology of the non-polarized, two-core connecting line be considered. Of course, the connecting line can also be designed for polarized use and can be connected accordingly.

To the extent it is expedient or advantageous in individual cases, it is possible to use a three-core or three-pole connecting line, respectively, especially if large capacities are to be transmitted. It also is possible to use multiple connecting lines.

Preferably, the control information is transmitted by means of a frequency modulation of the alternating voltage used for the power supply. Of course, it also is possible to transmit the control information by means of a phase modulation of the alternating voltage used for the power supply with constant frequency of the alternating voltage. As an alternative to using an angle modulation of the alternating voltage used for the power supply, described above, it also is possible to use an amplitude modulation of this alternating voltage for transmitting control information.

In an especially advantageous embodiment of the inventive thought, the control information is transmitted in binary form wherein individual binary values are represented and transmitted by an associated predetermined frequency of the alternating voltage used for the power supply. An immediate switchover of the frequency of the alternating voltage used for the power supply between two frequencies at a ratio of 10:11 has proven to be particularly advantageous in first trials. For example, a binary 1 can be depicted and transmitted by a higher frequency and a binary 0 can be depicted and transmitted by a lower frequency of the alternating voltage used for the power supply.

On the side of the electrical consumer it only is necessary to determine the frequency of the alternating voltage used for the power supply, or to distinguish between the two predetermined frequencies, respectively, in order to be able to determine the binary control information based on the determined frequency. Complex directions can be transmitted to an electrical consumer and used to control it by successively determining and analyzing successive binary control information.

It also is feasible to associate each bit not to one but to multiple different frequencies of the alternating voltage.

To simplify the transmission of complex control information and to be able to quickly and reliably control multiple different or similar electrical consumers in a simple manner, structured data formats and/or a predefined transmission protocol are to be used for transmitting the control information.

According to an embodiment of the inventive thought the electrical consumers are to be associated with a unique address and the control information is to contain identifying address information for the activated electrical consumer. To facilitate the control of multiple electrical consumers it is possible to combine multiple electrical consumers in one group with a common group address and for the control information to contain group address information that identifies the group. This group address information can be used in the place of, or in addition to, the address information of an individual electrical consumer and can be transmitted together with the control information. Of course, it can be arranged so that each consumer can belong to multiple groups.

To increase the reliability and resistance to interference during the transmission of control information, each binary value is transmitted by multiple oscillations of the alternating voltage. One piece of individual binary control information, i.e., one individual bit, thus corresponds to multiple successive pulses of the alternating voltage.

In an especially exemplary embodiment of the inventive thought, the number of oscillations transmitted for a binary value is inversely proportional to the respective associated frequency of the alternating voltage. This guarantees a constant length of each information unit or each binary value for the control information, respectively. The smallest unit of control information, a bit cell, thus always has the same duration. This means that the electrical consumer can analyze the control information using commercially available clock-controlled components.

Advantageously, the number of oscillations used for a binary value is inversely proportional, i.e., at a ratio of 11:10, when two predetermined frequencies at a ratio of 10:11 are used. However, it is possible to use different ratios, which is advantageous in individual cases.

In an advantageous manner the frequency of the alternating voltage used for the power supply is at least five kHz, preferably at least ten kHz and especially advantageously more than 20 kHz. Especially when an alternating voltage with a frequency of more than 20 kHz is used, it is impossible for the surroundings to be disturbed by frequency-related noise, for example. The use of an alternating voltage with a frequency above the auditory threshold furthermore has additional advantages such as the possibility of using inexpensive commercially available components. However, it also is feasible that the alternating voltage used is only several hundred hertz or approximately one to five kHz, if the respective applications require or allow this.

Given a basic frequency of 8 MHz and using suitable frequency division (factors 240 and 264), it is possible to generate frequencies of 30.3 kHz and 33.3 kHz that are suitable for a transmission of power and control information in a simple and inexpensive manner. When using suitable cables with low losses, it also is possible, for example, to use frequencies of 60.6 kHz and 66.6 kHz with a ratio of 132 to 120 as well as 121.2 kHz to 133.3 kHz with a ratio of 66 to 60.

A suitable variation could be a bit by bit change of the frequency (pulse width modulation), which has the advantage of providing a significantly higher transmissible data rate.

To facilitate shielding the cables used for the transmission of the alternating voltage and to reduce interaction with other electronic components, the edge steepness of the alternating voltage used for the power supply can be reduced in relation to an inexpensive square-wave signal. The object in particular is to avoid or suppress uneven harmonic waves of the frequencies that are relevant for the alternating voltage in order to increase the resistance to interference or to reduce transmission losses.

Especially advantageous results are obtained when the alternating voltage used for the power supply has low edge steepness. When using a sinus-shaped voltage, it is possible to avoid interfering high-frequency harmonics almost completely, however, it often is not cost-effective to generate such sinus-shaped voltage, which is advantageous in this regard.

In order to facilitate or improve the power transmission and power supply in case of an exclusive transmission of energy without any additional control information, the highest possible frequency is used for the alternating voltage for the power supply without transmitting any control information.

Since some electronic components advantageously are fed a binary input value when they are idle, a binary value of "1" is transmitted with the highest possible frequency. In case of a clearly longer, pure power transmission without additional control information at higher frequencies that are associated with binary value "1," the respective electronic components can be interconnected easily with the electronic consumers.

The invention further relates to a system for controlling and supplying power to at least one electrical consumer with at least one electrical consumer that is connectable by means of a cable electrically wired to an energy source.

According to the invention, the system comprises a device for generating an alternating voltage that is disposed between the energy source and the at least one electrical consumer, and a device for the angle modulation of the alternating voltage, and the electrical consumer comprises a decoder that records the angle modulation of the alternating voltage and can convert it into a control signal to activate the electrical consumer.

In most cases a suitable decoder can be compiled inexpensively using commercially available electronic and electric components. It is possible, for example, to use an inexpensive microprocessor with or without additional commercially available components or an individually developed and programmed microprocessor.

According to an advantageous embodiment of the inventive thought, the decoder features a universal asynchronous receiver/transmitter (UART). A suitable UART can be emulated inexpensively, for example, as a component of a commercially available microcontroller or microprocessor or based on software. This allows for simple, inexpensive and reliable decoding of the control signals. A steady pulse for transmitting the control signals or an equal duration of the transmitted control signals is not required when an UART is used. If the data are transmitted bit by bit, a pulse can be determined based on the transmitted data for each transmission. By using the frequency or phase of the alternating current used for the power supply as the carrier of the control information, the interference sensitivity is very low when the control information is transmitted.

To increase the resistance to interference even further and to reduce undesirable transmission losses, the device for generating an alternating voltage features a harmonic filter. By using a suitable harmonic filter prior to a transmission, it is especially possible to filter out interfering harmonics, which occur when inexpensive square-wave signals that cannot be completely suppressed are used to generate the alternating voltage.

If required, the cable between the device for generating an alternating voltage and the electrical consumer can comprise a shield.

According to the invention, the system can comprise a supply module or multiple supply modules that supply the electrical consumer with power and control information. The consumers can be connected to the supply module(s) by means of two lines or core wires (single-phase) or three lines (three-phase). Separate control information lines or lines for control voltages are not required.

It is advantageous that the mains suppression and a surge protector are centrally located in the supply module or that corresponding equipment is arranged there. The respective consumers therefore do not require this equipment for mains suppression and thus are more compact, simpler and inexpensive.

If it is necessary to supply the control devices with power, it can be taken from the supply voltage.

To increase the safety, the line on the generator and/or the consumer side can be electrically isolated by means of transformers. Especially when high frequencies are used, small and inexpensive transformers are commercially available.

To be able to use existing cabling structures, it is possible to expand the system using adapter devices that make the existing supply systems useable and receive their control information from the system or separately via wired or wireless means.

Furthermore, the supply module can comprise a rectifier and a filter capacitor, in particular link capacitor, for generating the non-polarized voltage.

The voltage supply of the supply modules can be direct current and can be taken from an existing mains such as an electrical system in vehicles or an on-board system on ships.

The voltage supply of the supply module is a single-phase or three-phase alternating voltage.

The supply modules can comprise a Power Factor Controller (PFC) for suppressing mains interferences and/or a device for stabilizing the link voltage.

The supply modules further can comprise a device for controlling and adjusting the level of the output voltage.

The supply modules also can comprise a transformer at the output to the consumers to adjust the mains or link voltage to the requirements of the system at will.

The supply modules can comprise an output stage comprised of electronic power semiconductor switches like FETs or IGBTs. The output stage itself can comprise a capacitor connected in series with the output transformer and/or electronic power semiconductor based on a full- or half-bridge circuit.

On the output side to the consumers, the supply modules can comprise a series connection comprised of a capacitor and a resistor for suppressing voltage spikes.

The supply modules can comprise a device for measuring the temperature of the module and/or the output stage to cause the output stage to shut down or to limit performance when the temperature is impermissibly high.

The supply modules can comprise a device for measuring and for limiting the current that runs through the output stage, if necessary, in several stages.

The supply modules additionally can comprise a device for shutting down the output stage quickly when the current is too high.

The supply modules can comprise a device for diverting the heat that is dissipated from the output stage and other components that dissipate heat.

The supply modules can comprise a device for limiting the maximum input current when they are turned on.

To protect against voltage spikes and transients the supply modules can comprise a mains filter and/or comparable suitable devices.

One or multiple supply modules can comprise a switch for the electric supply of the superior bus structure.

The supply modules can comprise a switch for the electrical isolation of the superior bus structure.

The supply modules can comprise one or multiple throttles or LC filters behind the output stage to limit the slew rate of the voltage. In a system as described above the supply module and/or a consumer can comprise at least one send and/or receive switch for transmitting data to the supply line.

The one supply module or multiple supply modules and one or multiple consumers can be connected with each other and/or with one or multiple control devices in the system.

The system can be used to control lighting devices or to control actuators, for example.

It also is feasible to combine the system with already existing communication and control systems, including bus systems and bus structures, such as Instabus (European installation bus EIB) using suitable interfaces, thus allowing for an integration in complex and at least partially existing systems.

The wiring between supply module[s] and electrical consumers can comprise separate distribution panels.

The wiring between supply modules and electrical consumers can comprise special cables with low capacity (in particular lower than 30 pF/m).

The wiring can comprise suitable plug connections with cut and/or clamp technology.

BRIEF DESCRIPTION OF THE DRAWINGS

The exemplary embodiments for the inventive thought shown in the figure are explained in more detail below. The following is shown.

DETAILED DESCRIPTION

Figure 1:
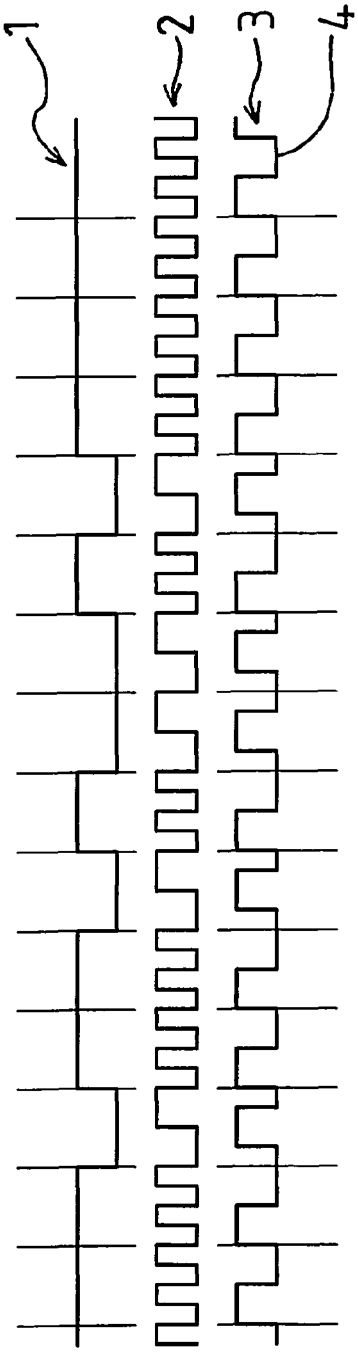
FIG. 1 shows a schematic view of the transmission of control information through a frequency or phase modulation of alternating voltage used for the power supply with the duration of an information unit being held constant.
Figure 2:
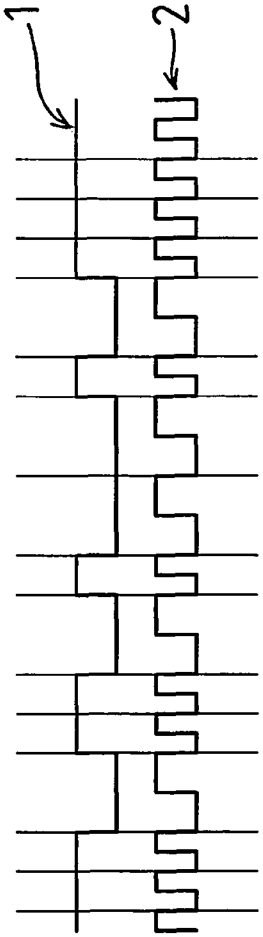
FIG. 2 shows a schematic view according to FIG. 1, in which the duration of individual information contents varies and is determined by the respective associated binary value.

In FIGS. 1 and 2 a series of binary values 1 is represented in the top line, which as a whole corresponds to control information for activating an electrical consumer. While in FIG. 1 each binary value 1 has an equal duration, the binary values 1 shown schematically in FIG. 2 are represented by bit cells with various lengths. At a distance below them, in FIGS. 1 and 2, a succession of frequency-modulated oscillations 2 of the alternating voltage 3 used for the power supply is depicted.

In order to obtain a matching length of the bit cells of the individual binary values 1, either one oscillation at a first, low frequency or two oscillations at twice the frequency are transmitted. FIG. 2 on the other hand shows the transmission of frequency modulated control information 2 with each binary value 1 being transmitted by exactly one oscillation at either a lower or at a higher frequency.

For illustration purposes, FIG. 1 also schematically shows a phase-modulated sequence of individual oscillations 4 of the alternating voltage 3. Based on the various phases at the beginning of each information unit or bit cell, it is possible to deduce complex control information based on the binary value 1 and thus for multiple binary values 1 that are transmitted in this manner.

Figure 3:
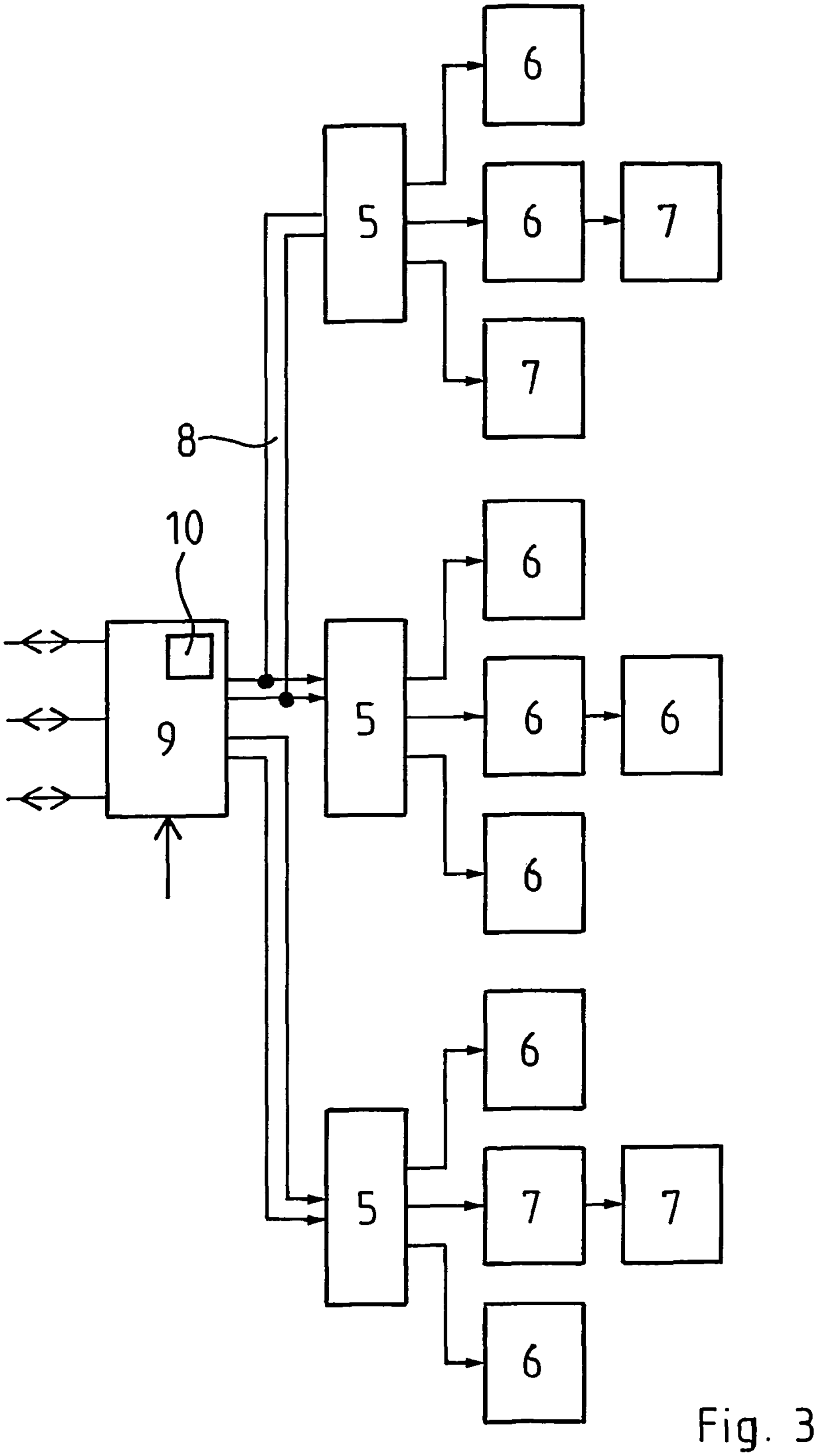
FIG. 3 shows a schematic view of a system for controlling and supplying multiple electrical consumers with power and FIG. 4 shows a simplified wiring diagram for a system for controlling and supplying an electrical consumer with power.

FIG. 3 schematically shows a system for controlling and supplying multiple electrical consumers with power. Each electrical consumer 5 can be comprised of a lighting device 6 or any kind of actuator 7, for example. Suitable lighting devices 6 can be comprised of one or multiple light emitting diodes (LEDs) or other lighting means with different color and brightness, if necessary. Actuators 7 can be, for example, control elements for shades, blinds or door openers and can be comprised of different assemblies and/or circuit boards, such as motors, relays, magnets or valves, as well as of other suitable actuators. Of course, lighting devices 6 and actuators 7 can also form a functional unit and together constitute the electrical consumer 5. The embodiment and possible uses of the electrical consumer 5 can be almost limitlessly diverse and can even include shower, wash and bathtub fittings; heating, cooling and ventilation controls; and electrically controllable sun shades, gate drives and safety devices.

The electric consumers 5 are connected electrically to a device for generating alternating voltage 9 by means of two-core, non-polarized connecting lines 8. This device for generating alternating voltage 9 in turn comprises a device for frequency modulation 10 of the alternating voltage.

The device for generating alternating voltage 9 in turn either can be supplied with the customary alternating voltages of 50 or 60 Hertz at 220 Volts or 110 Volts, with the alternating voltages known in certain mains of 16 Hz or 400 Hz or with direct current, for example. The working voltage of the system for controlling and supplying the electrical consumers 5 with power advantageously ranges between 40 and 120 Volts. In particular, a voltage of 48 is of interest since there are no significant requirements concerning accidental contact.

Operation and control of the device for generating alternating voltage 9 or the device for frequency modulation 10 of the alternating voltage can either be controlled directly by means of a USB, Internet, IP, W-LAN or similar system, or by an independent, non-conforming bus structure such as a bus structure based on RS485.

It also would be feasible to connect multiple devices for generating alternating voltage 9, including suitable operating elements and/or control elements using a bi-directional connecting line 8, using two or multiple bi-directional connecting lines 8 or using separate send and receive connections. A bus structure can be controlled from a central control unit or from multiple decentralized control units. The individual connecting lines 8 can also comprise fiberglass components.

The individual electrical consumers 5 can be arranged in series, in parallel or in a star-shape formation. Any combinatory structure is possible. In particular, it is possible to create linear structures of electrical consumers 5 in series by using suitable connecting elements and without using filter devices or matching circuits.

The maximum line transmission of the entire system and thus the maximum number of electrical consumers 5 is limited only by the maximum cross-section of the connecting lines 8 that are used as well as by the required electrical isolation of the components that are used in regard to each other and their surroundings.

The control of the individual functions of electrical consumers 5 is based on a predefined protocol with a unique identification of the selected electrical consumer 5 as well as the subsequently transmitted data that can be elected to consist of or comprise a unique synchronous code, addressing, length specification, a command code, an index, test data and use data (payload) in any or in a predefined order.

Each electrical consumer 5 can be associated with a unique identification number. This identification number or address can be included in the product description or can be indicated directly or by means of a sticker on the electrical consumer 5 to identify it during installation, for example.

This identification can also be based on special methods, e.g., a modulated code for the utility function.

It is feasible for the electrical consumer 5 additionally to transmit status information wirelessly, for example, to the central receiving unit, which can analyze and display individual status information.

It also is feasible for a feedback channel to be transmitted to the connecting line 8 at a higher frequency.

Figure 4:
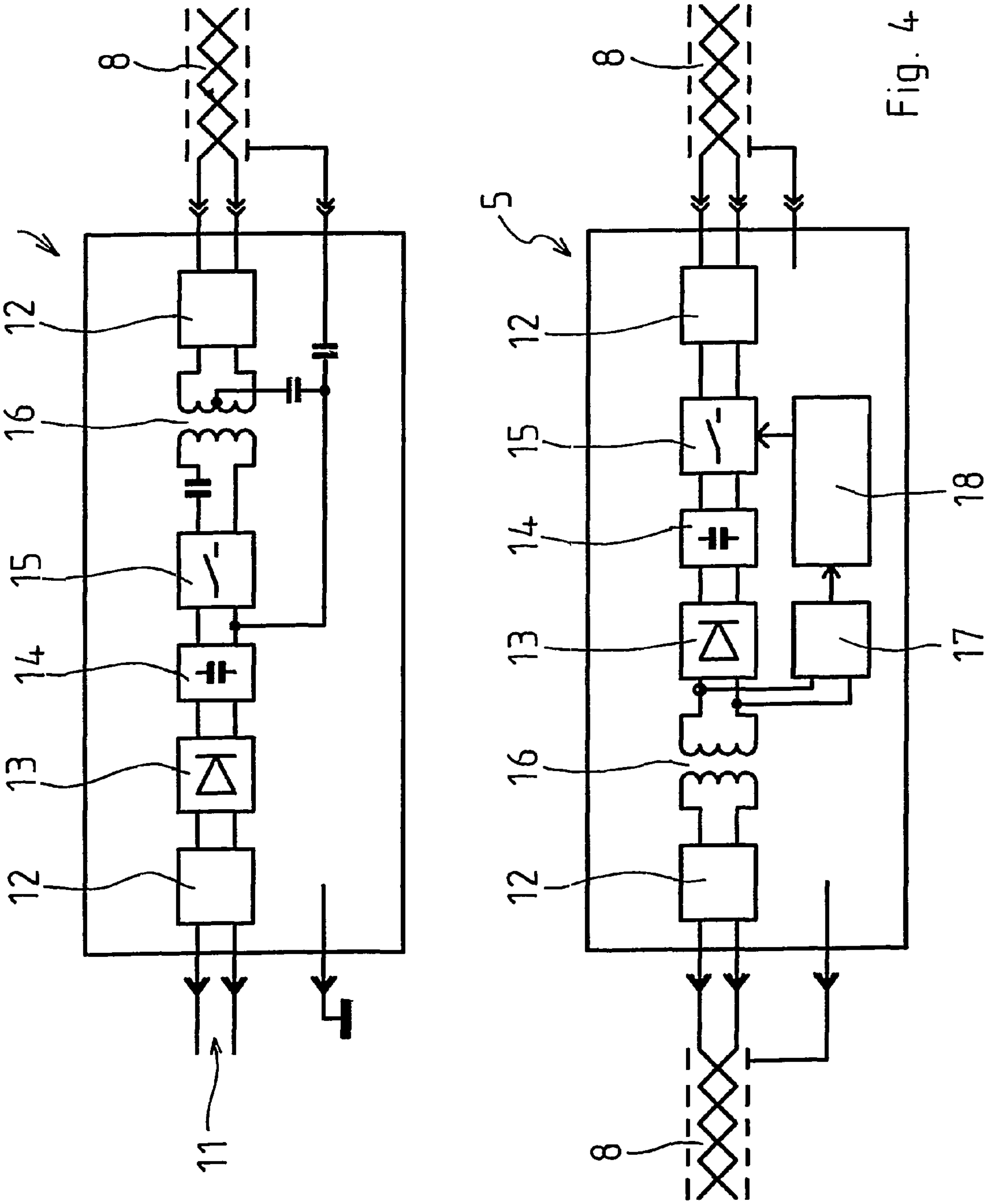

FIG. 4 shows an example of a device for generating alternating voltage 9 as well as an electrical consumer 5 with a respective electrical switch. The device for generating alternating voltage 9 is supplied with electric energy via the supply lines 11 shown on the left side. After running through a filter 12 of a rectifier 13 and a link circuit 14, an alternating voltage that is suitable for the power supply of the electrical consumer 5 is generated by means of an actuator 15 and a transformer 16, said alternating voltage being fed into the two-core, twisted connecting line 8 by means of another filter 12. The actuator 15 allows switching between different frequencies of the alternating voltage to transmit a control signal to the electrical consumer 5 using frequency modulation. The use of a filter 12 or a rectifier 13 depends on the form of energy that is fed by means of the supply line 11.

The alternating voltage that arrives at the electrical consumer 5 is fed by means of a filter 12 and a transformer 16 to a decoder 17, which determines the frequency modulation or the predefined frequency and transmits it to a control device 18 to control the electrical consumer 5. The control device preferably is a suitably configured and programmed microprocessor. If desired, the incoming alternating voltage can be fed again through a rectifier 13, a link circuit 14, and an actuator 15 or a filter 12, respectively, into another connecting line 8 to connect another electrical consumer 5.

The invention claimed is:

1. Method for controlling and supplying power to at least one electrical consumer, comprising connecting the at least one electrical consumer in a wired, electrically conductive fashion to an energy source, transmitting electrical energy by an alternating voltage, and transmitting control information for controlling the at least one electrical consumer to the electrical consumer by an angle modulation of the alternating voltage used for the power supply, wherein the control information is transmitted by a frequency modulation of the alternating voltage used for the power supply and is transmitted in binary form, wherein individual binary values are represented and transmitted by an associated predetermined frequency of the alternating voltage used for the power supply.

2. Method according to claim 1 wherein the electrical energy and the control information are transmitted on the same lines.

3. Method according to claim 1 wherein at least one of structured data formats and a predetermined transmission protocol is used to transmit the control information.

4. Method according to claim 3, wherein the electrical consumers are associated with a unique address and the control information contains address information that identifies the electrical consumer controlled.

5. Method according to claim 1 comprising combining multiple electrical consumers in one group with a common group address and wherein the control information contains group address information that identifies the group.

6. Method according to claim 1 wherein each binary value is transmitted by multiple oscillations of the alternating voltage.

7. Method according to claim 1 wherein the number of the oscillations transmitted for a binary value is proportional to the associated frequency of the alternating voltage.

8. Method according to claim 1 wherein the frequency for the alternating voltage used for the power supply is at least 5 kHz.

9. System for controlling and supplying power to at least one electrical consumer comprising at least one electrical consumer that is connectable in a wired, electrically conductive fashion to an energy source by a cable, a device for generating an alternating voltage, which is disposed between the energy source and the at least one electrical consumer, a device for angle modulation of the alternating voltage, wherein the device for angle modulation transmits a control signal by a frequency modulation of the alternating voltage used for the power supply in binary form, wherein individual binary values are represented and transmitted by an associated predetermined frequency of the alternating voltage used for the power supply, and wherein the electrical consumer comprises a decoder that records the angle modulation of the alternating voltage and converts it to a control signal to control the electrical consumer.

10. The system according to claim 9 wherein the decoder comprises a UART.

11. System according to claim 9 wherein the device for generating an alternating voltage comprises a harmonic filter.

12. System according to claim 9 wherein the cable between the device for generating an alternating voltage and the electrical consumer comprises a shield.

* * * * *